United States Patent
Sipka et al.

(10) Patent No.: US 12,379,238 B2
(45) Date of Patent: Aug. 5, 2025

(54) MASS FLOW CONTROLLER WITH ADVANCED BACK STREAMING DIAGNOSTICS

(71) Applicant: Illinois Tool Works Inc., Glenview, IL (US)

(72) Inventors: Joseph John Sipka, Mckinney, TX (US); Randy Burnham, Horsham, PA (US); Adam Paul Stauts, Perkasie, PA (US)

(73) Assignee: Illinois Tool Works Inc., Glenview, IL (US)

( * ) Notice: Subject to any disclaimer, the term of this patent is extended or adjusted under 35 U.S.C. 154(b) by 321 days.

(21) Appl. No.: 16/662,870

(22) Filed: Oct. 24, 2019

(65) Prior Publication Data
US 2020/0132536 A1 Apr. 30, 2020

Related U.S. Application Data

(60) Provisional application No. 62/751,321, filed on Oct. 26, 2018.

(51) Int. Cl.
*G01F 25/00* (2022.01)
*G05D 7/06* (2006.01)

(52) U.S. Cl.
CPC ....... *G01F 25/0092* (2013.01); *G05D 7/0635* (2013.01)

(58) Field of Classification Search
CPC .. G01F 25/0092; G01F 1/6842; G01F 1/6847; G01F 5/00; G01F 15/002;
(Continued)

(56) References Cited

U.S. PATENT DOCUMENTS

| | | |
|---|---|---|
| 5,062,446 A | 11/1991 | Anderson |
| 5,816,285 A | 10/1998 | Ohmi et al. |

(Continued)

FOREIGN PATENT DOCUMENTS

| | | | |
|---|---|---|---|
| CN | 106104222 | * | 11/2016 |
| JP | 1994-028040 A | | 2/1994 |

(Continued)

OTHER PUBLICATIONS

Pierre Delajoud & Martin Girard, A High Accuracy, Portable Calibration Standard for Low Mass Flow, Presented Sep. 6, 1984 at the XIII IMEKO World Congress of Metrology, Torino Italy, DH Instruments, Inc., Tempe AZ, US,. CalTechnix SA Neuilly sur Seine, FR.

(Continued)

*Primary Examiner* — Robert R Raevis
(74) *Attorney, Agent, or Firm* — McAndrews, Held & Malloy, Ltd.

(57) ABSTRACT

A diagnostics system comprising a controller for controlling operations of a mass flow controller. The controller is communicable coupled to at least one sensor and to a valve and tuned to control the valve based on a predetermined set point value and communication from the at least one sensor. The controller determines at least one predetermined value associated with a reverse flow of a fluid and either cause the controller to enter a hard fault or a safe state. The predetermined value of the flow is either a percentage of total flow or a percentage of total flow over a time period. The controller can log the date, time, and a device identifier in response to determining the at least one predetermined value. In addition, the diagnostics system can include a centralized controller configured to receive diagnostics data from a plurality of controllers and control operation of the controllers.

6 Claims, 3 Drawing Sheets

(58) Field of Classification Search
CPC .... G01F 15/003; G01F 15/005; G01F 15/043; G01F 15/046; G01F 25/10; G01F 25/15; G05D 7/0635; G05B 23/02; G05B 21/02
USPC ............. 73/1.16, 1.24, 1.25, 1.34, 1.36, 168
See application file for complete search history.

(56) References Cited

U.S. PATENT DOCUMENTS

| | | | |
|---|---|---|---|
| 5,925,829 | A | 7/1999 | Laragione et al. |
| 6,119,710 | A | 9/2000 | Brown |
| 6,216,726 | B1 | 4/2001 | Brown et al. |
| 6,845,659 | B2 | 1/2005 | Lull |
| 7,272,512 | B2 | 9/2007 | Wang et al. |
| 7,431,945 | B2 | 10/2008 | Ban et al. |
| 8,028,055 | B2 | 9/2011 | Duffield et al. |
| 8,271,210 | B2 | 9/2012 | Chung et al. |
| 8,504,318 | B2 | 8/2013 | Mendelson et al. |
| 8,744,784 | B2 | 6/2014 | Yasuda et al. |
| 9,256,228 | B2 | 2/2016 | Smirnov et al. |
| 9,523,435 | B2 | 12/2016 | Monkowski et al. |
| 9,983,595 | B2 | 5/2018 | Monkowski et al. |
| 10,031,005 | B2 | 7/2018 | Ding |
| 10,054,959 | B2 | 8/2018 | Somani |
| 2006/0008328 | A1 | 1/2006 | Morgan et al. |
| 2010/0070089 | A1 | 3/2010 | Harrod et al. |
| 2013/0042476 | A1 | 2/2013 | Carter et al. |
| 2015/0121988 | A1 | 5/2015 | Banares et al. |
| 2015/0234393 | A1 | 8/2015 | Kehoe et al. |
| 2016/0003665 | A1 | 1/2016 | Valentine et al. |
| 2016/0041564 | A1 | 2/2016 | Mudd et al. |
| 2016/0195415 | A1 | 7/2016 | Lull |
| 2016/0216713 | A1* | 7/2016 | Mudd .................. G05D 7/0635 |
| 2016/0252912 | A1 | 9/2016 | Horwitz |
| 2017/0052546 | A1 | 2/2017 | Monkowski et al. |
| 2018/0246531 | A1 | 8/2018 | Somani et al. |

FOREIGN PATENT DOCUMENTS

| | | |
|---|---|---|
| JP | H06028040 | 2/1994 |
| JP | 1994-341880 A | 12/1994 |
| JP | H06341880 | 12/1994 |
| JP | 1995-225616 A | 8/1995 |
| JP | 3270192 * | 4/2002 |
| JP | 2008-176774 A | 7/2008 |
| JP | 2008176774 | 7/2008 |
| JP | 2014-504766 A | 2/2014 |
| WO | 2012100181 A1 | 7/2012 |
| WO | 2018053538 A1 | 3/2018 |

OTHER PUBLICATIONS

International Search Report and Written Opinion dated Jan. 23, 2020, issued in related International Application No. PCT/US2019/058152.

Taiwan Office Action Appln No. 108138600 with search report dated Apr. 17, 2024.

Korean Office Action Appln No. 10-2021-7014448 dated Mar. 29, 2024.

* cited by examiner

MASS FLOW CONTROLLER WITH ADVANCED BACK STREAMING DIAGNOSTICS

BACKGROUND

Many industrial processes require precise control of various process fluids. For example, in the semiconductor industries, mass flow meters (MFMs) are used to precisely measure an amount of a process fluid that is introduced to a process chamber. In addition to measuring the mass flow, mass flow controllers (MFCs) are used to precisely measure and control the amount of process fluid that is introduced to a process chamber. It is to be understood that the term fluid, as used herein, applies to any type of gas or vapor to which controlled flow may be of interest.

Maintenance of these devices is required in order to maintain acceptable performance levels. Maintenance of these devices can be timely and require advanced knowledge of the device operations and, as such, can be expensive to maintain. Many MFC's have self-diagnostic capabilities that are based on built in hardware that have limited capabilities. The limited capabilities and complex design of existing MFC diagnostic systems only add to the cost of the MFC.

BRIEF DESCRIPTION OF THE DRAWINGS

Illustrative embodiments of the presently disclosed subject matter are described in detail below with reference to the attached drawing figures, which are incorporated by reference herein and wherein.

DETAILED DESCRIPTION

Figure 1:
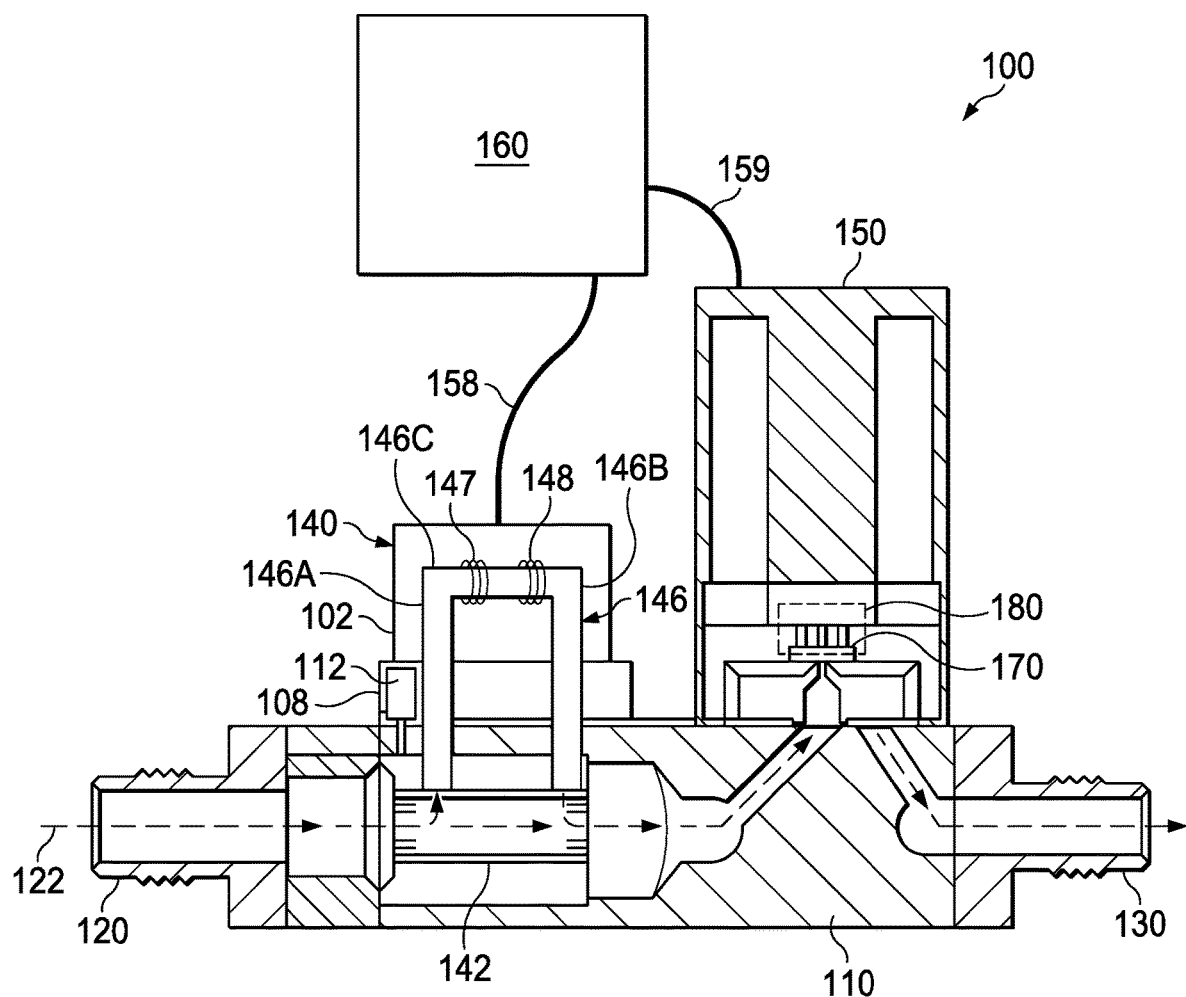
FIG. 1 illustrates a mass flow controller with a control and advanced diagnostics electronics, according to certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

An MFC tuned to control a specific type of fluid under known conditions, i.e. pressure, volume, and temperature, can often become de-tuned during installation, maintenance, and testing. Furthermore, the MFC can become detuned because unknown operating conditions or simply due to use, i.e. wear and tear. All considering, de-tuning of the MFC can be determined by understanding normal and abnormal MFC variable behavior and acting upon a recognized issue before the issue affects associated operations, e.g. yield in a manufacture supply chain. As such, an advanced MFC diagnostics system can improve operations of a manufacture supply chain. However, without careful consideration, design and development of a system to address such issues can be complex and very costly.

An advanced diagnostics system used to calibrate and control operation of a previously tuned MFC is disclosed herein. The diagnostics system monitors select variables, such as adjustments to set point values and reverse flow rate, generates notifications when an issue is recognized, and can cause the MFC to calibrate and shutdown. The diagnostics system can re-tune the MFC based on a modified tuning variable or variables, such as set point, temperature, pressure, and volume. In addition, if the reverse flow rate reaches an undesirable level, the diagnostics system can shut the MFC down. In addition, the advanced diagnostics system can be designed and developed completely in software, such as firmware, or a combination or hardware and software.

As used herein, tune refers to an MFC that has been previously tuned, e.g. at a lab or MFC manufacturing facility, prior to entry into service. Calibrate, as used herein, refers to operations performed on an MFC controller to adjust control variables to reflect any changes from the time of tuning the MFC to the time of operation or during its operation. Set point is a variable comprising an identifier and a value. The set point is a desired flow rate and is set during the tuning stage based on known factors, such as fluid type, pressure, volume, and temperature. During MFC operation there can be many adjustments to the set point, e.g. to correct for slight drift, caused by normal operation of the MFC. As will be discussed later, the number of adjustments can reflect several issues with the MFC, or, more specifically, with tuning variables of the MFC. Reverse flow rate, as used herein, refers to a rate of a flow of fluid in a direction back to a fluid source. As an example, fluid used in a manufacturing process, e.g. manufacture of semiconductor devices, travels from an upstream source to a downstream process chamber. In this example, the reverse flow rate relates to fluid traveling in the direction back to the upstream source.

FIG. 1 illustrates an example of a thermal mass flow controller (MFC) 100 in accordance with a disclosed embodiment but may include other type of mass flow sensing methods. The mass flow controller 100 includes a block 110, which is the platform on which the components of the MFC 100 are mounted. A thermal mass flow meter 140 and a valve assembly 150 containing a control valve 170 are mounted on the block 110 between a fluid inlet 120 and a fluid outlet 130. The thermal mass flow meter 140 includes a bypass 142 through which typically a majority of fluid flows and a thermal flow sensor 146 through which a smaller portion of the fluid flows. The bypass 142 is tuned with the known fluid to determine an appropriate relationship between fluid flowing in the mass flow sensor and the fluid flowing in the bypass 142 at various known flow rates, so that the total flow through the flow meter can be determined from a thermal flow sensor output signal. The thermal flow sensor 146 and bypass 142 can then be mated to the control valve 170 and control and diagnostic and controller 160 and then tuned again, under known conditions. The responses of the control and diagnostic and controller 160 and the control valve 170 are then characterized so that the overall response of the system to a change in set point or input pressure is known, and the response can be used to control the system to provide the desired response. Other functionality of the control and diagnostic and controller 160 include advanced diagnostic features relating to zero trending, zero recommended, bad zero determination, excessive zero drift, and back streaming, as will be discussed in greater detail with respect to FIGS. 2 and 3.

The thermal flow sensor 146 is contained within a sensor housing 102 (portion shown removed to show the thermal flow sensor 146) mounted on a mounting plate 108. The thermal flow sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146C to a temperature above that of the fluid flowing through the bypass 142. The resistance of windings 147, 148 varies with temperature. As fluid flows through the sensor conduit, heat is carried from the upstream resistor 147 toward the downstream resistor 148, with the temperature difference being proportional to the mass flow rate through the sensor.

An electrical signal related to the fluid flow through the sensor is derived from the two resistive windings 147,148. The electrical signal can be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter can be determined are described, for example, in commonly owned U.S. Pat. No. 6,845,659, which is hereby incorporated by reference. The electrical signals derived from the resistive windings 147, 148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller. For example, the mass flow sensor can be tuned by running known amounts of a known fluid through the sensor portion and adjusting certain signal processing parameters to provide a response that accurately represents fluid flow. For example, the output can be normalized, so that a specified voltage range, such as 0 V to 5 V of the sensor output, corresponds to a flow rate range from zero to the top of the range for the sensor. The output can also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated. Diagnostics of the sensor can also be performed to determine if the sensor requires maintenance or if the other aspects of the MFC requires attention or maintenance.

When the type of fluid used by an end user differs from that used in tuning and/or calibration, or when the operating conditions, such as inlet and outlet pressure, temperature, range of flow rates, etc., used by the end user differ from that used in tuning and/or calibration, the operation of the mass flow controller is generally degraded. For this reason, the flow meter can be tuned or calibrated using additional fluids (termed "surrogate fluids") and or operating conditions, with any changes necessary to provide a satisfactory response being stored in a lookup table. U.S. Pat. No. 7,272,512 to Wang et al., for "Flow Sensor Signal Conversion," which is owned by the assignee of the present invention and which is hereby incorporated by reference, describes a system in which the characteristics of different gases are used to adjust the response, rather than requiring a surrogate fluid to calibrate the device for each different process fluid used.

In addition, the mass flow controller 100 can include a pressure transducer 112 coupled to flow path at some point, typically, but not limited to, upstream of the bypass 142 to measure pressure in the flow path. Pressure transducer 112 provides a pressure signal indicative of the pressure. In accordance with the disclosed embodiments, the pressure transducer 112 is used to measure pressure during a flow measurement.

Diagnostics and controller 160 control the position of the control valve 170 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller 100.

In the illustrated example, the flow rate is supplied by electrical conductors 158 to a closed loop system and diagnostics and controller 160 as a voltage signal. The signal is amplified, processed and supplied using electrical conductors 159 to the control valve assembly 150 to modify the flow. To this end, the controller 160 compares the signal from the mass flow sensor 140 to predetermined values and adjusts the control valve 170 accordingly to achieve the desired flow. The control valve 170 can be a Piezo or other technology valve configured to operate at flow rates greater than or equal to two standard liters per minute.

Figure 2A:
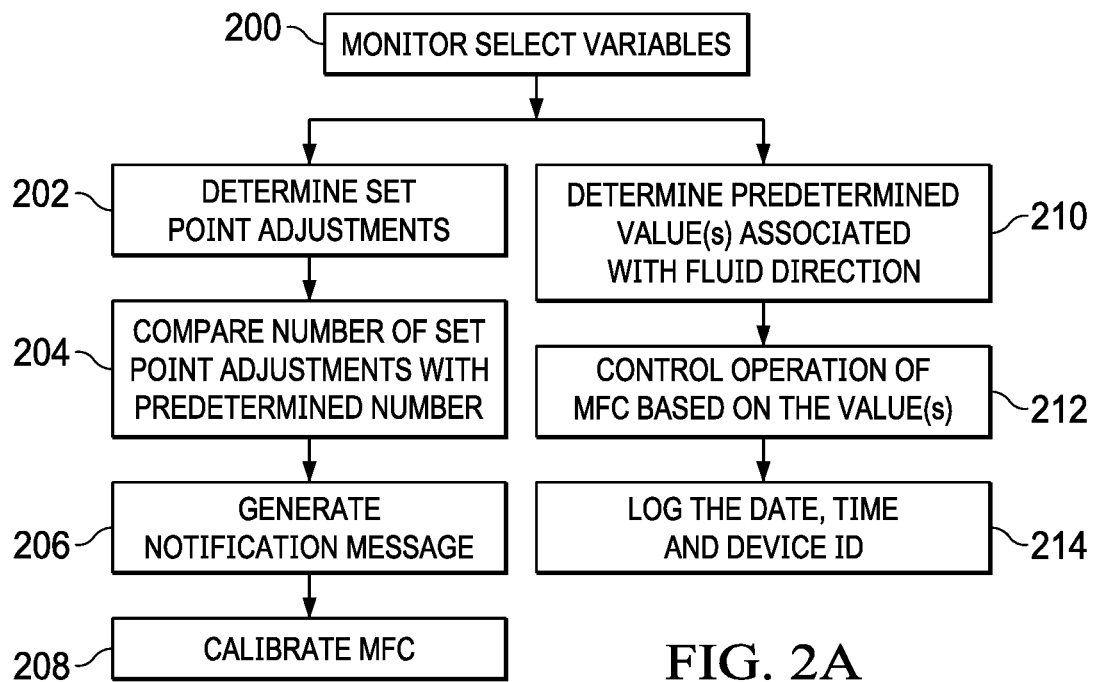
FIGS. 2A-2B illustrate diagrams of algorithms for diagnosing and controlling operations of the mass flow controller, according to certain example embodiments.
Figure 2B:
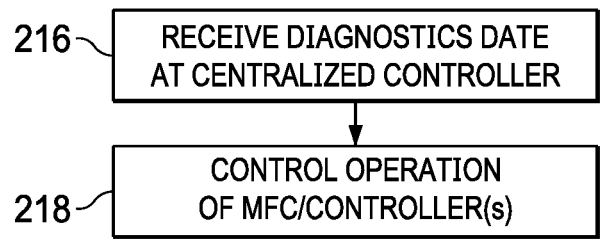

Referring now to FIGS. 2A-2B, illustrated are diagrams of algorithms for diagnosing and controlling operations of the MFC 100, in accordance with example embodiments. FIG. 2A is a diagram of an algorithm for diagnosing and controlling MFC 100 operations locally. At block 200, select variables, i.e. MFC process and control variables, are monitored. Process variables can include measured pressure, temperature, volume, and flow rate of a fluid. Control variables can include known variables such as set point, set point adjustments, temperature volume, fluid type, flow rate, and predetermined variables. Set point variable is measured flow rate. Predetermined variables can be a number of a desired set point, set point adjustments, a reverse flow, and a reverse flow rate. A desired set point and a desired flow rate is based on known fluid type, pressure, temperature, direction, and volume. Set point adjustments is a number of adjustments made by the controller 160. At block 202, a number of set point adjustments is determined. During the normal course of MFC 100 operation, the fluid flow rate can deviate from the desired set point. At block 204, the number of set point adjustments is compared to at least one predetermined number. The comparison can be between a total number of adjustments as a function of total gas hours, e.g. adjustments as a function of total gas. The information is helpful in understanding the structure and stability of the MFC 100 before performing as-found calibration checks. Zero adjustments or adjustments, e.g., can indicate potential problems. Zero adjustments can indicate a system protocol has not been followed, an incorrectly installed MFC 100, contamination build-up, or a drifting MFC 100, which can mean potentially a non-functioning MFC. Adjustments, e.g., can indicate MFC 100 component degradation and/or a deviation in operating conditions. Any of which, constitutes diagnostics or health check and possibly calibration. At block 206, a notification message is generated. The notification message can include at least one of at least one value for temperature, valve drive, set point, sensor flow rate, gas flow hours, time, fluid type, and a remaining number of set point adjustments based on a total fluid hours. At block 208, the variables or select variables are calibrated based on a specific situation. Calibration may only require resetting of the desired set point. However, it may require a partial or complete re-tuning of the MFC 100 based on partially or completely different known variable settings. Calibration is performed, at least in part, based on one of the predetermined number of set point value adjustments, results of the comparison, and user input. Other variables can also be monitored. At block 210, reverse fluid flow can be monitored. If the reverse flow exceeds a predetermined value, e.g. a percentage of the total flow or a percentage of the total flow over a period of time, operation of the MFC 100 is controlled, block 212. In this case, the algorithm can force the MFC 100 into a hard fault or a safe state. At block 214, the incident is logged. The information logged can include the date, time, and device identifier. Although block 208 and block 214 are described in this embodiment as being performed locally, it should be understand that calibration commands can be performed remotely and logging systems can be designed to store logging data remotely. Referring now to FIG. 2B, illustrated is a diagram of an algorithm for processing diagnostics or logging data and controlling diagnostics and controller 160 from a centralized controller, such as a Programmable Logic Controller (PLC) or Distributed Control System (DCS). At block 216, the centralized controller receives notification messages and/or logging data from a plurality of MFCs 100. This information can be acted upon by a process engineer. At block 218, MFCs 100 and diagnostics and controller 160 can be caused to be calibrated or their operations controlled.

As used herein, the term hard fault means the MFC 100 is non-operable, e.g. due to liquid in a sensor, which can affect the MFC's ability to detect changes in temperature. Safe state is a software or hardware setting that forces the MFC 100 into a predetermined valve state. The safe state is used during start-up and recovery for process and tool alarms.

Figure 3:
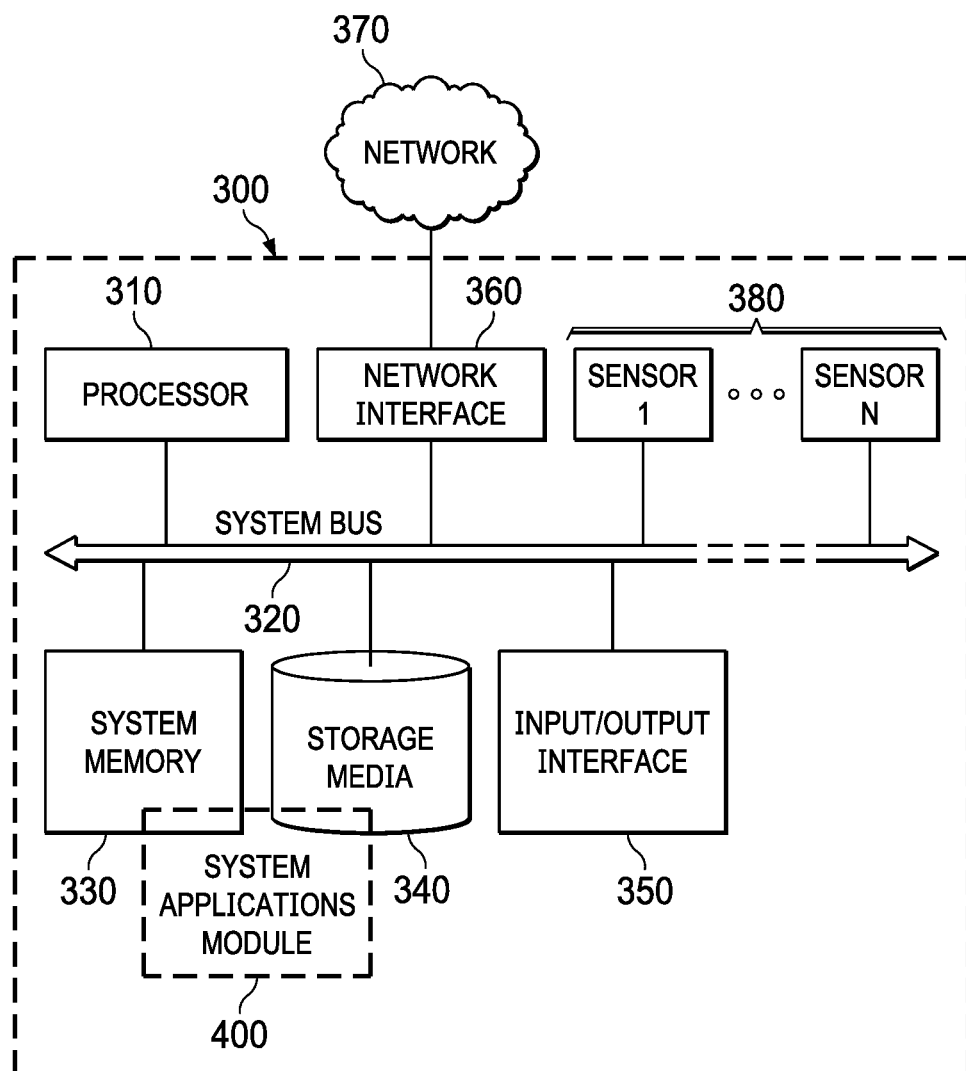
FIG. 3 is a block diagram depicting a computing machine and system applications, according to certain example embodiments.

Referring now to FIG. 3, illustrated is a computing machine 300 and a system applications module 400, in accordance with example embodiments. The computing machine 300 can correspond to any of the various computers, mobile devices, laptop computers, servers, embedded systems, or computing systems presented herein. The module 400 can comprise one or more hardware or software elements, e.g. other OS application and user and kernel space applications, designed to facilitate the computing machine 300 in performing the various methods and processing functions presented herein. The computing machine 300 can include various internal or attached components such as a processor 310, system bus 320, system memory 330, storage media 340, input/output interface 350, a network interface 360 for communicating with a network 370, e.g. local loop, cellular/GPS, Bluetooth, or WIFI, and a series of sensors 380, e.g. any of the sensors identified in relation to FIG. 1.

The computing machines can be implemented as a conventional computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

The processor 310 can be designed to execute code instructions in order to perform the operations and functionality described herein, manage request flow and address mappings, and to perform calculations and generate commands. The processor 310 can be configured to monitor and control the operation of the components in the computing machines. The processor 310 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 310 can be a single processing unit, multiple processing units, a single processing core, multiple processing cores, special purpose processing cores, co-processors, or any combination thereof. According to certain embodiments, the processor 310 along with other components of the computing machine 300 can be a software based or hardware based virtualized computing machine executing within one or more other computing machines.

The system memory 330 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 330 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 330. The system memory 330 can be implemented using a single memory module or multiple memory modules. While the system memory 330 is depicted as being part of the computing machine, one skilled in the art will recognize that the system memory 330 can be separate from the computing machine 300 without departing from the scope of the subject technology. It should also be appreciated that the system memory 330 can include, or operate in conjunction with, a non-volatile storage device such as the storage media 340.

The storage media 340 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 340 can store one or more operating systems, application programs and program modules, data, or any other information. The storage media 340 can be part of, or connected to, the computing machine. The storage media 340 can also be part of one or more other computing machines that are in communication with the computing machine such as servers, database servers, cloud storage, network attached storage, and so forth.

The applications module 400 and other OS application modules can comprise one or more hardware or software elements configured to facilitate the computing machine with performing the various methods and processing functions presented herein. The applications module 400 and other OS application modules can include one or more algorithms or sequences of instructions stored as software or firmware in association with the system memory 330, the storage media 340 or both. The storage media 340 can therefore represent examples of machine or computer readable media on which instructions or code can be stored for execution by the processor 310. Machine or computer readable media can generally refer to any medium or media used to provide instructions to the processor 310. Such machine or computer readable media associated with the applications module 400 and other OS application modules can comprise a computer software product. It should be appreciated that a computer software product comprising the applications module 400 and other OS application modules can also be associated with one or more processes or methods for delivering the applications module 400 and other OS application modules to the computing machine via a network, any signal-bearing medium, or any other communication or delivery technology. The applications module 400 and other OS application modules can also comprise hardware circuits or information for configuring hardware circuits such as microcode or configuration information for an FPGA or other PLD. In one exemplary embodiment, applications module 400 and other OS application modules can include algorithms capable of performing the functional operations described by the flow charts and computer systems presented herein.

The input/output ("I/O") interface 350 can be configured to couple to one or more external devices, to receive data from the one or more external devices, and to send data to the one or more external devices. Such external devices along with the various internal devices can also be known as peripheral devices. The I/O interface 350 can include both electrical and physical connections for coupling the various peripheral devices to the computing machine or the processor 310. The I/O interface 350 can be configured to communicate data, addresses, and control signals between the peripheral devices, the computing machine, or the processor 310. The I/O interface 350 can be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 350 can be configured to implement only one interface or bus technology. Alternatively, the I/O interface 350 can be configured to implement multiple interfaces or bus technologies. The I/O interface 350 can be configured as part of, all of, or to operate in conjunction with, the system bus 320. The I/O interface 350 can include one or more buffers for buffering transmissions between one or more external devices, internal devices, the computing machine, or the processor 320.

The I/O interface 320 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 320 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 300 can operate in a networked environment using logical connections through the NIC 360 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 310 can be connected to the other elements of the computing machine or the various peripherals discussed herein through the system bus 320. It should be appreciated that the system bus 320 can be within the processor 310, outside the processor 310, or both. According to some embodiments, any of the processors 310, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a mass flow controller comprising: an inlet configured to receive fluid; a flow path in which the fluid passes; a valve configured to regulate a forward flow of the fluid out of an outlet of the mass flow controller; at least one sensor configured to monitor fluid through the flow path and valve operations; and a controller communicable coupled to the at least one sensor and to the valve, the controller tuned to control the valve based on a predetermined set point value and communication from the at least one sensor, the controller further comprises a diagnostics system is configured to: determine at least one predetermined value associated with a reverse flow of a fluid; control operation of the controller based on the at least one predetermined value;

Clause 2, the mass flow controller of clause 1, wherein the predetermined value of the flow is a percentage of total flow;

Clause 3, the mass flow controller of clause 1, wherein the predetermined value of the flow is a percentage of total flow over a period of time;

Clause 4, the mass flow controller of clause 1, wherein the diagnostics system is further configured to log the date, time, and a device identifier in response to determining the at least one predetermined value;

Clause 5, the mass flow controller of clause 1, wherein the diagnostics system is further configured to cause the controller to enter one of a hard fault and a safe state;

Clause 6, the mass flow controller of clause 1, further comprising a centralized controller configured to: receive diagnostics data from a plurality of controllers; and control operation of at least one of the plurality of controllers;

Clause 7, a diagnostics system for controlling operation of a mass flow controller, the diagnostics system comprising: a controller communicable coupled to at least one sensor and to a valve, the controller tuned to control the valve based on a predetermined set point value and communication from the at least one sensor, the controller is configured to: determine at least one predetermined value associated with a reverse flow of a fluid; control operation of the controller based on the at least one predetermined value;

Clause 8, the diagnostics system of clause 7, wherein the predetermined value of the flow is a percentage of total flow;

Clause 9, the diagnostics system of clause 7, wherein the predetermined value of the flow is a percentage of total flow over a period of time;

Clause 10, the diagnostics system of clause 7, wherein the controller is further configured to log the date, time, and a device identifier in response to determining the at least one predetermined value;

Clause 11, the diagnostics system of clause 7, wherein the controller is further configured to cause the controller to enter one of a hard fault and a safe state;

Clause 12, the diagnostics system of clause 7, further comprising a centralized controller configured to: receive diagnostics data from a plurality of controllers; and control operation of at least one of the plurality of controllers;

Clause 13, a method of controlling operation of a mass flow controller, the method comprising: receiving data from at least one sensor; controlling a valve based on a predetermined set point value and communication from the at least one sensor; determining at least one predetermined value associated with a reverse flow of a fluid; controlling operation of a controller based on the at least one predetermined value;

Clause 14, the method of clause 13, wherein the predetermined value of the flow is a percentage of total flow;

Clause 15, the method of clause 13, wherein the predetermined value of the flow is a percentage of total flow over a period of time;

Clause 16, the method of clause 13, further comprising: logging the date, time, and a device identifier in response to determining the at least one predetermined value;

Clause 17, the method of clause 13, further comprising: causing the controller to enter one of a hard fault and a safe state;

Clause 18, the method of clause 13, further comprising: receiving, at a centralized controller, diagnostics data from a plurality of controllers; and controlling operation of at least one of the plurality of controllers.

What is claimed is:

1. A mass flow controller comprising:
   an inlet configured to receive fluid;
   a flow path in which the fluid passes;
   a valve configured to regulate a forward flow of the fluid out of an outlet of the mass flow controller;
   at least one sensor configured to monitor fluid through the flow path and valve operations; and
   a controller communicably coupled to the at least one sensor and to the valve, the controller tuned to control the valve based on a predetermined set point value and communication from the at least one sensor, the controller further comprises a diagnostics system configured to:
   monitor a reverse flow of a fluid through the flow path;
   compare the reverse flow to a predetermined reverse flow;
   in response to determining that the reverse flow exceeds the predetermined reverse flow, log the date, time, and a device identifier; and
   control operation of the mass flow controller based on the comparison.

2. The mass flow controller of claim 1, wherein the diagnostics system is further configured to cause the controller to enter one of a hard fault and a safe state in response to the reverse flow being greater than the predetermined reverse flow.

3. A diagnostics system for controlling operation of a mass flow controller, the diagnostics system comprising:
   a controller communicable coupled to at least one sensor and to a valve, the controller tuned to control the valve based on a predetermined set point value and communication from the at least one sensor, the controller is configured to:
   monitor a reverse flow of a fluid through a flow path of the mass flow controller;
   compare the reverse flow to a predetermined reverse flow;
   in response to determining that the reverse flow exceeds the predetermined reverse flow, log the date, time, and a device identifier; and
   control operation of the mass flow controller based on the comparison.

4. The diagnostics system of claim 3, wherein the controller is further configured to cause the controller to enter one of a hard fault and a safe state in response to the reverse flow being greater than the predetermined reverse flow.

5. A method of controlling operation of a mass flow controller, the method comprising:
   receiving data from at least one sensor;
   controlling a valve based on a predetermined set point value and communication from the at least one sensor;
   monitoring at least one of a reverse flow of a fluid through a flow path of the mass flow controller or a reverse flow over a period of time;
   comparing the at least one of the reverse flow or the reverse flow over the period of time to a corresponding one of a predetermined reverse flow or a predetermined reverse flow over the period of time; and
   in response to determining that the reverse flow exceeds the predetermined reverse flow, logging the date, time, and a device identifier;

controlling operation of the mass flow controller based on the comparison.

6. The method of claim 5, further comprising: causing the controller to enter one of a hard fault and a safe state in response to the reverse flow being greater than the predetermined reverse flow or the reverse flow over the period of time being greater than the predetermined reverse flow over the period of time.

\* \* \* \* \*